United States Patent

[11] 3,576,423

[72] Inventors Arthur A. Bernard
Beecher;
Richard A. Bernard, Flossmoor, Ill.
[21] Appl. No. 840,582
[22] Filed June 5, 1969
Division of Ser. No. 650,051, June 29, 1967, Pat. No. 3,469,070.
[45] Patented Apr. 27, 1971
[73] Assignee Bernard Welding Equipment Company
Beecher, Ill.

[54] ARC WELDING GUN
4 Claims, 17 Drawing Figs.
[52] U.S. Cl. .................................................. 219/136, 219/130
[51] Int. Cl. .................................................. B23k 9/00
[50] Field of Search .................................... 219/136, 130; 287/103; 285/39

[56] References Cited
UNITED STATES PATENTS

| | | | |
|---|---|---|---|
| 965,131 | 7/1910 | Bliss | 287/103 |
| 2,477,818 | 8/1949 | Murdock | 287/103 |
| 2,763,762 | 9/1956 | Jepson | 219/238X |
| 3,105,707 | 10/1963 | Jacobson | 285/39 |
| 3,151,889 | 10/1964 | Petrin | 285/39 |
| 3,053,966 | 9/1962 | Landis et al. | 219/130 |
| 3,121,784 | 2/1964 | McGinty et al. | 219/130X |
| 3,128,370 | 4/1964 | Meyer | 219/130 |
| 3,194,943 | 7/1965 | Flora | 219/130 |
| 3,283,121 | 11/1966 | Bernard et al. | 219/130 |

Primary Examiner—J. V. Truhe
Assistant Examiner—George A. Montanye
Attorney—Hume, Clement, Hume & Lee ABSTRACT: A high current capacity arc welding gun for gas-shielded, continuous feed, consumable electrode arc welding processes. Features include: a unique handle cooled by convection air flow; an improved head assembly having a unique electrical insulating ion impervious shield for preventing destructive arcing to the gas nozzle, an improved shielding gas flow path through the head assembly which additionally cooperates with the ion impervious shield to prevent gas nozzle arcing, a unique current contact top which attaches to the head assembly by a novel curved wedge clamping concept and which is produced by an improved, versatile, and inexpensive method of manufacture that increases the copper density and refines the grain structure in the current contact tip for greater life; an improved gooseneck lining for longer life and reduced friction; a heat protected control switch assembly of rugged construction and unique trigger operation; and an improved welding cable connection assembly.

Patented April 27, 1971

Inventors
Arthur A. Bernard
Richard A. Bernard

By

Attorneys

ARC WELDING GUN

This is a division of application Ser. No. 650,051, filed June 29, 1967, now U.S. Pat. No. 3,469,070.

This invention relates to arc welding guns used for applying gas-shielded, continuous feed, consumable electrode arc welding processes.

There has been a long standing need for an air-cooled arc welding gun which can handle a much higher range of welding current than conventionally-designed air-cooled arc welding guns because the efficiency of all arc welding processes, measured by the rate at which electrode metal is melted and converted into weld metal, is directly related to the volume of welding current used to melt the electrode. Accordingly, it is a very important object of this invention to provide an air-cooled arc welding gun for gas-shielded, continuous feed, consumable electrode arc welding processes which is capable of handling a range of welding current up to 800 plus amperes at a 60 percent duty cycle as compared to the top range of about 500 amperes at a 60 percent duty cycle to which present conventional air-cooled arc welding guns are generally limited.

The problems which must be solved in developing an air-cooled gun which has a capacity for handling an additional 300 amperes of welding current cannot be solved simply by increasing the size or electrical conductivity of those parts of conventional arc welding guns which conduct the welding current or by increasing the size of the welding current cable connected thereto. Since an understanding of the problems involved will aid in understanding the present invention, it will be helpful to discuss some of these problems at this point.

Increasing the size of the arc welding gun to increase its welding current capacity increases the effort that is required for manipulating the gun along the course of welding when the seams to be welded are located in confined and cramped areas. Accordingly, it is another object of the present invention to provide an ultrahigh current capacity air-cooled arc welding gun which is not larger in overall size than conventional arc welding guns which are limited to a much lower range of welding current.

Adding weight to an arc welding gun to increase its current conducting capacity increases operator fatigue, and, hence, welding operators either resent or refuse to use guns which weigh more than conventional. Consequently, another object of this invention is to provide an arc welding gun which weighs no more than conventional arc welding guns with a much slower welding current capacity. This low weight feature was made possible primarily by reducing the number of parts comprising the arc welding gun. For example, that portion of conventional arc welding guns commonly called the body portion has been completely eliminated.

One principal factor which determines the current handling capacities of an arc welding gun is the maximum permissible temperature of the handle of the gun. The limiting temperature of the handle of an arc welding gun is 140° F. If the handle exceeds 140° F., even by 1° or 2°, it may blister the operator's hand. Therefore, in the arc welding gun of the present invention, the handle does not exceed 140° F. even though this gun operates at a much higher range of welding current than conventional air-cooled arc welding guns. This achievement was attained by recognizing and accepting the fact that it is not resistance heating within the arc welding gun that is the principal cause of the high temperatures encountered in arc welding guns but rather the radiated heat of the arc itself which is picked up by the current contact tip and head member and conducted back through the welding gun into the welding current cable where it is dissipated by radiation. Thus, increasing the electrical conductivity of the current conducting parts of the arc welding gun will not effectively reduce the temperature to which the gun is heated during prolonged periods of welding. Nor has circulating water or other coolant through the current conducting members of the gun, as in conventional water-cooled guns, made it possible to maintain the handle sufficiently cool to operate at the high current range now made possible with the present invention. The higher the welding current to the arc, the higher is the heat conducted back through the gun into the welding current cable, and even in water-cooled guns this high heat flow through the handle cannot be prevented by the conventional circulation of coolant through the current conducting members of the gun. In fact, one of the primary objects of the present invention is not only to eliminate the original investment cost of such liquid cooling apparatus and the cost of maintaining such apparatus but additionally to provide an air-cooled gun capable of handling at least 200 amperes more welding current than is handled by conventional water-cooled guns. In the present invention, the high heat flow through the gun to the welding current cable is accepted, but the handle of the gun is not highly heated. Specifically, it is a very important object of the present invention to efficiently insulate the handle of the arc welding gun from the highly heated current conducting parts contained therein by providing a tubular handle which is open at both ends and telescoped over the metal parts which conduct heat through the handle from the arc zone and back into the welding cable and which is mounted so as to space the interior surface of the handle from the exterior surfaces of these heat conducting metal parts, thereby forming effectively a ventilating duct between these surfaces which extends the total length of the handle and is open at both ends. As will be more fully described further on, the heated metal parts extending through the handle opening cause air convection in and through the handle opening, cooling the exterior surfaces of these metal parts and the interior surfaces of the handle. This structure is clearly distinct from the design of conventional air-cooled arc welding guns in which the so-called body portion within the interior of the handle completely fills or blocks the interior of the handle, thus totally preventing any cooling circulation of air through the handle as occurs in the present invention.

Another very difficult problem which had to be solved to provide the high current capacity arc welding gun of the present invention was the problem of electrically insulating the gas nozzle from the welding current circuit plus shielding the gas nozzle from the high density of ions which is developed around the welding current circuit members within the gas nozzle when these contained circuit members are charged with the new high range of welding current and highly heated by radiation from the arc because this high density of ions is capable of providing a conductive path for the welding current from the contained circuit members when the dimension between the gas nozzle and the workpiece is equal to or less than the dimension of the welding arc. It was established during extensive development in creating this invention that this coronalike condition which surrounds the head member of the gun, the current contact tip, and that portion of the electrode which extends from the current contact tip to the welding arc is capable of initiating a destructive arc to the gas nozzle. Accordingly, the gas nozzle must not only be electrically insulated from the welding current circuit, but must also be shielded from the high density of ions surrounding these three parts of the welding current circuit. In accordance with the present invention, therefore, an ion impervious tubular shield is interposed between the gas nozzle and the head member in the arc welding gun. This ion impervious shield is a unitary member since if it were of two or more pieces, the small seam or separation between the pieces even of a few thousandths of an inch would permit a seepage of ions through the seam or separation to kindle an arc between the head member and the gas nozzle and then from the gas nozzle to the workpiece. Moreover, neither the gas nozzle nor its attaching means can extend rearwardly of this tubular ion impervious shield, or arcing with the terminus of the gas nozzle attaching means will result.

The gas nozzle itself is formed from a short length of copper or brass thin-wall tube in a punch press operation. Accordingly, it is easily and inexpensively formed. Moreover, since the wall of the nozzle is purposely thin, spatter which accumulates on the nozzle can be removed quickly and simply by tapping or rapping the side of the nozzle against the weldment or other surface. This cracks the ring of brittle spatter into small pieces which fall from the nozzle.

As will be seen from the detailed description, the head member of the arc welding gun of the present invention is provided with an annular arrangement of shielding gas outlet ports, which ports are inclined forwardly with respect to the axis of the head member so that the gas flow impinges tangentially against the interior surface of the insulating member and flows along the interior surface of the insulating member and the gas nozzle in an annular configuration which serves to purge the space adjacent the interior surface of the gas nozzle at its forwardmost end which is not protected by the tubular shield in order to prevent high ion density in this region. In short, the tubular ion impervious shield coacts with the particular form of gas flow in preventing arc initiating conditions adjacent the surfaces of the gas nozzle. Moreover, the particular arrangement of angularly oriented gas ports have their exit orifices or openings in a cylindrical outer surface of the head member, thereby reducing the possibility of plugging the gas ports with weld spatter.

The control switch assembly on the present arc welding gun is mounted on the exterior surface of the handle to isolate the switch assembly from the high volume of heat radiating from the suspended main trunk which extends through the handle. Only two small openings through the handle are necessary for passage of two control wires through the handle for attachment to the terminals of the switch. Moreover, since the switch assembly is mounted on the outside of the handle, it must be of a shape and construction to withstand rough usage. Accordingly, it is an important object of the present invention to provide a control switch assembly meeting these requirements. As will be seen from the detailed description further on, the control switch assembly of the present invention meets these requirements with a construction which is unique both in structure and operation.

Another important aspect of the present invention is the welding current contact tip which is characterized by a number of markedly advantageous features. As is well known, the life of a current contact tip under certain conditions is limited and may be measured in terms of hours. For example, when the electrode being deposited is 3/32-inch diameter or larger, and when knurled feed rollers are used in the electrode feeding machine, the knurled feed rollers roughen the surface of the electrode causing actual rasping out of the bore of the current contact tip as the electrode is fed therethrough. Therefore, it is another very important object of the present invention to provide a current contact tip which, because of its structure and its method of manufacture, is less expensive than conventional current contact tips, yet has a greater useful life than conventional current contact tips. Conventional current contact tips are normally threaded for threaded engagement in the bore of the head member. However, threading the current contact tip not only increases its cost but also provides a form of connection to the head member which is attended by several problems as will be described further on. The conventional threaded current contact tip costs the user about $2.00 apiece on the market, whereas the current contact tip of the present invention costs the user approximately one-fourth of that amount. Moreover, the useful life of the current contact tip of the present invention under the abrasive action of the roughened surface electrode is about twice that of a conventional threaded current contact tip. Accordingly, for large fabricators, who deposit many tons of electrode monthly, and thus use thousands of current contact tips monthly, the savings may amount to many thousands of dollars monthly. This invention makes possible such cost saving for two principal reasons: (1) the design or structure of the current contact tip was developed to be very simple and to provide low cost manufacture, and (2) a greater life for the current contact tip of this invention is provided by purposely altering and refining the arrangement of grain formation of the copper and increasing the hardness of the copper by the unique method of manufacture described herein. For example, the Rockwell C hardness of the commercial copper tubing from which the current contact tip of this invention is manufactured averages 8 to 12, and this hardness is increased by the method of manufacture of the present invention to an average of 30 to 40, an increase of over 300 percent. As will be seen from the ensuing detailed description, the current contact tips of the present invention are made from commercial size copper tubing. The copper is actually compressed into a state of greater density as the commercial copper tube is converted to the dimensions required to produce the current contact tip of the present invention. In this regard, it is important that the method of manufacture of the present invention not be likened to a conventional swedging operation in which the size of the bore of a copper tube is not reduced by a thickening of the wall, but rather by reducing the outside diameter of the tube and retaining the wall thickness with a corresponding reduction in the diameter of the bore. In the method of the present invention, the wall thickness itself is altered.

As previously noted, the threaded connection generally used on conventional current contact tips is attended by serious problems. During the life of a contact tip, the tip is heated many, many times to an extremely high temperature during welding and then permitted to cool when welding stops. This repeated heating and cooling results in a slight loosening of the threaded connection with each cycle of heating and cooling which necessitates frequent retightening and if the tightness is not maintained, an arcing develops between the two threaded surfaces which destroys the threads and this, in turn, necessitates rethreading or discarding both of these parts. Also, being made of soft copper, the threads are easily and frequently damaged in handling. The current contact tip of the present invention is held within the bore of the head member by a binding force developed by a unique cam action surface as will be completely described in the ensuing detailed description. As will be seen, the unique cam action attachment is arranged to accommodate slight flexure of the current contact tip to eliminate loosening due to thermal expansion and contraction.

The electrical connection necessary between the current contact tip and the electrode itself is obtained in the present invention by imparting to the continuous electrode, just before it reaches the current contact tip, a curved configuration so that the curved electrode produces its own spring force for making efficient electrical contact as the curvature of the electrode is straightened out in passing through the straight bore of the current contact tip. Accordingly, it is another important object of the present invention to provide an improved curved gooseneck portion of the gun within which electrode is curved to insure efficient welding current contact with the electrode within the current contact tip. More specifically, it is an object of the present invention to reduce the amount of friction along the inner surface of the gooseneck portion and the surface of the electrode as the electrode is fed therethrough in order to reduce the force required to push the electrode through this portion of the arc welding gun. In addition, it is an object of the present invention to increase the life of the gooseneck portion of the arc welding gun. In conventional practice, to provide for efficient conduction of welding current through the gooseneck portion of the welding gun, the gooseneck portion is fabricated of copper in the form of a tube or pipe. The copper tube or pipe may or may not be lined with a common steel or stainless steel tube. Being harder than copper, such conventional steel liner tubes do increase the life of this portion of the gun and, to a minor extent, reduce the magnitude of force required to push the electrode through this portion of the arc welding gun. In accordance with the present invention, however, the gooseneck portion of the gun is improved by lining the gooseneck with a series of short length bushings made of extremely hard alloyed steel or tungsten carbide. By increasing the hardness of the surface over which the soft steel electrode is slid, the friction is reduced proportionately. Therefore, the amount of force required to push the electrode through hardened steel or tungsten steel carbide bushings is reduced to a minimum, as is the rate of wear.

It is still another object of the present invention to provide an improved system for connecting the rearward terminus of the arc welding gun to the flexible conduit through which the electrode is fed to the gun. The conventional flexible conduit consists of a helical spring wire formed as a tube. In accordance with the present invention, the main trunk of the arc welding gun at its rearward portion is provided with a threaded bore having the same pitch as the helical pitch of the spring wire forming the flexible conduit. The flexible conduit is then connected to the arc welding gun by threading it into this bore.

As will be apparent to those skilled in the art, many of the unique structural features of the subject arc welding gun which cooperate to make possible its ultrahigh welding current capacity may also be employed to great advantage in arc welding guns operating at conventional current levels, in arc welding guns for submerged arc and self-shielded arc welding processes, and in other applications.

These and other features and objects of the present invention will be better understood by reference to the following detailed description and the accompanying drawings.

Figures 1, 8, 9, 10, 11:
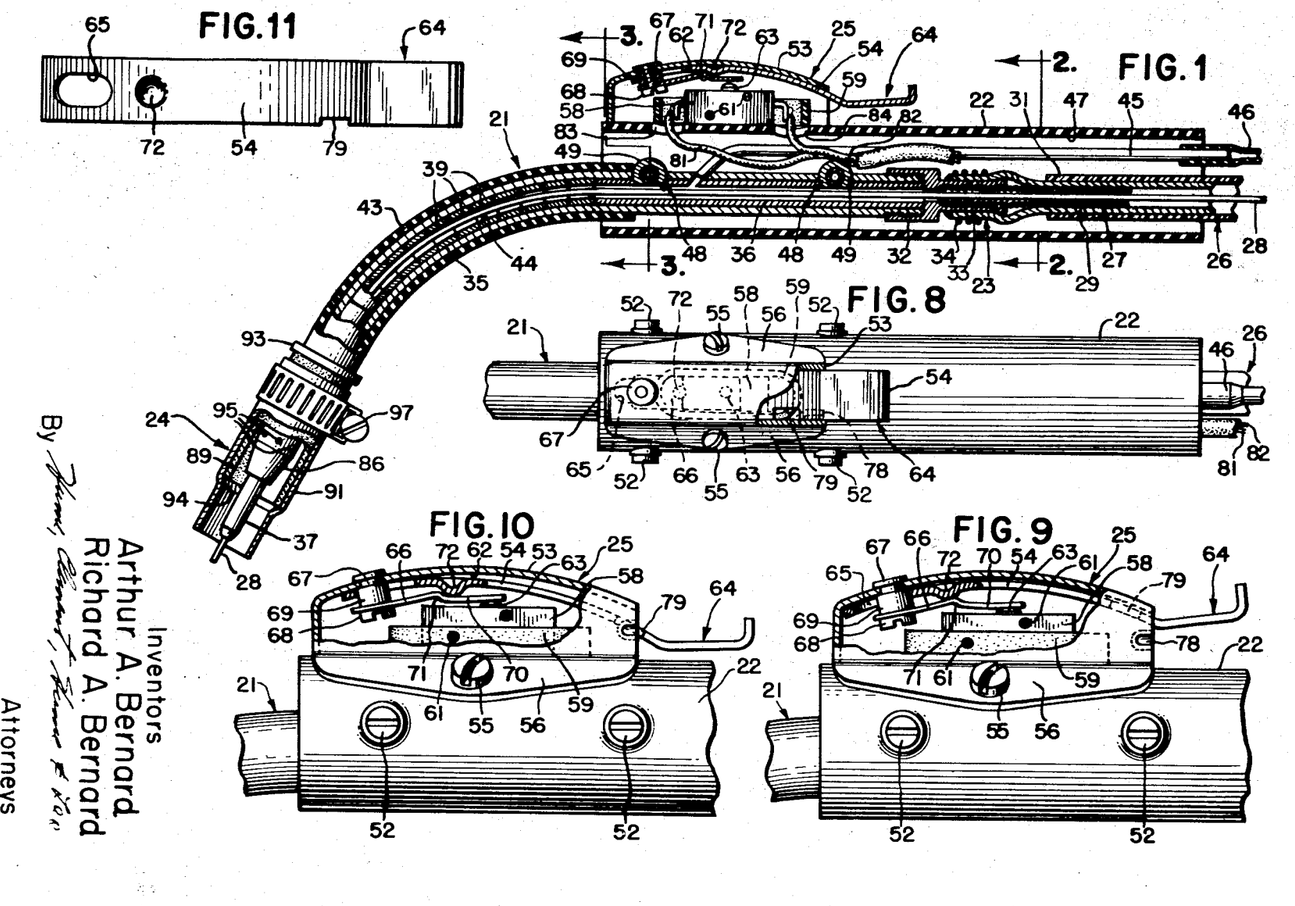
FIG. 1 is a side view of the arc welding gun for the present invention partially in cross section and partially in elevation.
FIG. 8 is an enlarged top view in elevation of the control switch assembly of the present invention mounted on the handle of the arc welding gun and shown in released position.
FIG. 9 is an enlarged side view of the control switch assembly mounted on the handle of the arc welding gun and shown partially in elevation and partially in cross section and in locked position.
FIG. 10 is another enlarged view of the control switch assembly shown partially in cross section and partially in elevation and in depressed position.
FIG. 11 is an enlarged view of the trigger member utilized in the control switch assembly.

Referring now to FIG. 1, it is seen that the arc welding gun comprises broadly a main trunk 21 on which is mounted a welding cable connector assembly 23, a handle 22, and a head assembly 24. The handle 22, in turn, carries a control switch assembly 25. The main trunk 21 is the principal structural support element of the subject arc welding gun and the means by which the consumable electrode 28, the shielding gas, and the welding current are conducted to the head assembly 24 of the gun where these materials are combined to produce the particular type of arc welding process. Accordingly, it is believed that the most logical format for presenting the detailed description of the subject arc welding gun is to describe first the main trunk 21 and then the various other structures of the arc welding gun in the order they are carried on the main trunk 21 proceeding from the rearward end to the forward end thereof. The reader, however, is requested to bear in mind that the structures are not necessarily being presented in their order of importance.

THE MAIN TRUNK

Figures 2, 3, 4:
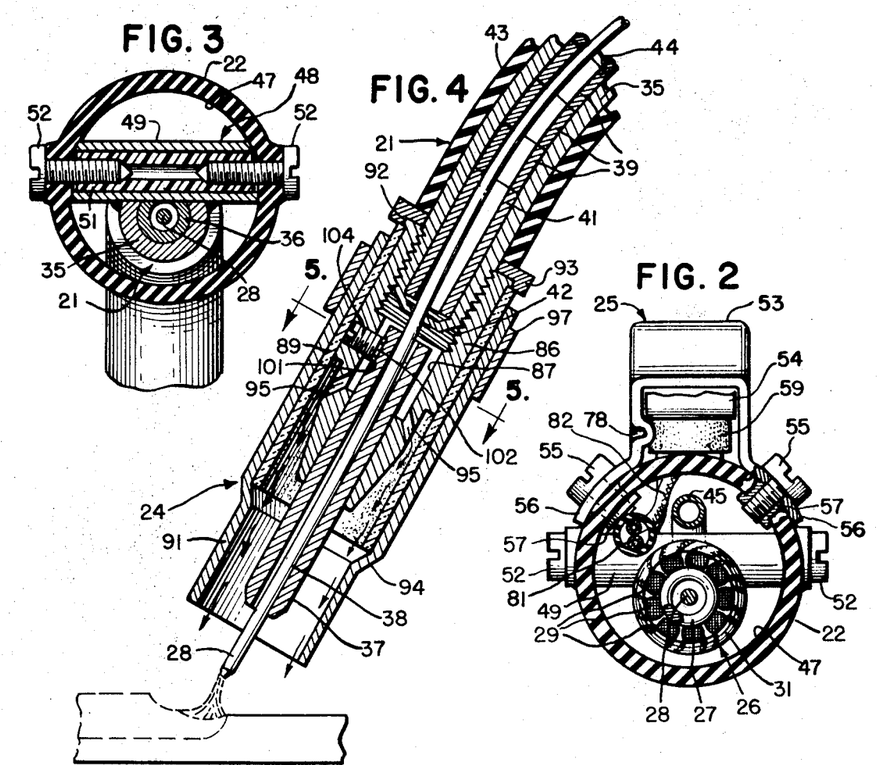
FIG. 2 is an enlarged cross-sectional view taken at 2–2 of FIG. 1.
FIG. 3 is an enlarged cross-sectional view taken at 3–3 of FIG. 1.
FIG. 4 is an enlarged cross-sectional view of the head portion of the arc welding gun.

The main trunk 21 comprises basically a rigid thick-walled copper pipe 35. For the straight portion of its length through the handle 22, the copper pipe 35 is preferably provided with a steel liner tube 36. From the forward end of the handle 22, the copper pipe 35 is curved as a gooseneck for the twofold purpose of (1) facilitating the manual deposition of weld metal and (2) forming the electrode 28 into a curve just prior to its passage through the current contact tip 37 so that the curved electrode provides its own spring force for making efficient electrical contact with the current contact tip 37 as it passes through the straight bore 38 (FIG. 2) of the current contact tip. The radius and angular extent of the gooseneck curve are preferably related to the size of electrode the gun is intended to handle to insure proper electrical contact as the electrode passes through the current contact tip bore 38. For example, for an arc welding gun intended to handle 3/32-inch to ⅛-inch diameter electrode, the gooseneck portion of the pipe 35 is preferably curved through an arc of approximately 30° at a radius of approximately 4 inches. It is a unique feature of the present arc welding gun that the gooseneck portion of the copper pipe 35 is lined with a series of hardened steel or tungsten carbide straight-bore bushings 39 serially disposed in end-to-end relationship as shown in FIGS. 1 and 4 and locked in position by the additional hardened steel or tungsten carbide bushing 41 which abuts the peened-over lip 42 at the extreme forward end of the copper pipe 35 (FIG. 4). The extremely hard bushings 39 serve to prolong the life of the gooseneck portion of the copper pipe 35 and reduce the push force required to feed the electrode through the gun. Depending upon the radius of the gooseneck section of the copper pipe 35, the length of the individual bushings 39 should not exceed a factor of six times the bore of the bushings. To prevent kinking of the electrode, the bore of the bushings 39 should not exceed twice the diameter of the smallest diameter electrode to be handled, yet at least 9 percent larger than the largest diameter electrode to be handled. By way of example, the individual length of the bushings 39 may vary between ¼ and inch The exterior surface of the gooseneck portion of the copper pipe 35 is covered with a tubular jacket 43 of electrical insulating material such as braided or laminated glass fiber or neoprene.

The bore 44 of the main trunk 21 conducts both the electrode 28 and the shielding gas to the head assembly 24 of the gun. To introduce the shielding gas into the bore 44, a copper tube 45 is provided which extends through the wall of the copper pipe 35 and the liner 36 to communicate with the interior bore 44 of the main trunk. Connection with the shielding gas source (not shown) is obtained by telescoping the gas hose 46 over the rearward end of the tube 45.

As previously noted, the main trunk 21 also serves to conduct the welding current to the head assembly 24 of the welding gun. The wall thickness of the copper pipe 35 should be sufficient to insure adequate conductivity. By way of example, in a gun intended to handle three thirty-second inch to ⅛-inch diameter electrode at high welding currents, the copper pipe 35 preferably has an outside diameter of 0.540 inch and an inside diameter of 0.294 inch which results in a wall thickness of 0.123 inch.

THE CABLE CONNECTOR ASSEMBLY

It is conventional practice in continuous feed, consumable electrode welding operations to feed the electrode to the welding gun through a flexible conduit which also forms the core of the welding cable. An electrode feeding apparatus is conventionally employed to push the electrode through this flexible conduit to the welding gun. In FIGS. 1 and 2, the welding cable is identified by reference numeral 26, and the flexible conduit is identified by reference numeral 27. As shown, the flexible conduit 27 comprises a rather heavy gauge spring wire helically formed as a tube. To prevent kinking of the electrode, the inside diameter of the conduit 27 should not exceed twice the diameter of the smallest diameter electrode 28 to be fed through the conduit 27. However, the inside diameter should be at least 9 percent larger than the largest diameter of the electrode 28 to be fed through the conduit 27. For example, a 0.160 inch inside diameter conduit is suitable for three thirty-seconds inch, seven sixty-fourths inch, and ⅛-inch diameter electrodes. To provide proper stiffness and sufficient flexibility, the conduit 27 for these three sizes of electrode should be made from spring wire of about 0.084-inch gauge. As best shown in FIG. 2, the welding current cable 26 overall consists of several conductor cable elements 29 which are helically wrapped about flexible conduit 27 and a jacket 31 composed of rubber or neoprene material for electrically insulating the conducting cable elements 29. The connector assembly 23 provides a unique arrangement for connecting the welding cable 26 and its internal flexible conduit 27 to the arc welding gun. The connector assembly 23 comprises a cylindrical member 32 which is tightly threaded by tapered threads onto copper pipe 35 to form the rearward end of the main trunk 21. The member 32 is uniquely provided with an axial bore 33, the rearward portion of which is enlarged and provided with threads of the same pitch as the pitch of the helical turns of spring wire forming the flexible conduit 27. Thus, the flexible conduit 27 is easily and quickly attached to the member 32 simply by threading its end into the bore 33 wherein it is held very securely. The several conducting elements 29 of the welding cable 26 are bound to the outer surface of the member 32 with a tightly wrapped length of wire 34 and then soldered to the member 32 to provide an efficient electrical connection. This means of connecting the welding cable 29 to the member 32 prevents any possibility of the flexible conduit from turning and becoming disconnected from the member 32.

THE AIR FLOW HANDLE

As previously noted, the principal cause of "hot gun" conditions is the heat radiated from the welding arc itself to the current contact tip and the head member of the gun and conducted back through the arc welding gun by the welding current conducting elements of the arc welding gun, through the handle of the gun and into the welding current cable, establishing a thermal gradient along the length of the welding current cable. Obviously, the higher the welding current conducted to the arc, the higher is the heat conducted back to the handle of the gun into the welding current cable. For example, in the present air-cooled arc welding gun when operating at 800 amperes with a 35-volt arc, the main trunk copper pipe 35 can become heated to a temperature upward to 400° F. depending on the duty cycle time. Yet the outer surface of the handle 22 must not exceed 140° F. The air flow handle 22 construction of the present invention makes it possible to maintain the handle surface sufficiently low in temperature despite such ultrahigh current welding conditions.

The handle 22 is a self-supporting tubular member having a longitudinal bore 47 of circular cross-sectional configuration which is open at both ends and which is telescoped over the rearward portion of the main trunk 21. It is preferably fabricated of vulcanized paper base fiber although other electrically insulating and low heat conductivity materials may be found useful. Referring to FIGS. 1 and 3, it is seen that the handle 22 is carried and spaced from the highly heated copper pipe 35 by two pairs of projections 48. Each pair of projections 48 is preferably formed of a section of brass tube 49 which is silver soldered or otherwise securely fastened in a transverse recess in the periphery of the copper pipe 35 as shown in FIG. 3. Inserted within the bore of each of the brass tubes 49 is a heat resistant bushing 51 of resin bonded asbestos fiber or other suitable heat insulating and electrical insulating material. The handle 22 is mounted on the projections 48 by self-threading screws 52 which are each passed through the handle and threaded into one of the bushings 51. The screws are thereby insulated from both the heat and electricity of the main trunk copper pipe 35.

The open bore 47 of the handle effectively forms a columnar ventilating duct enabling convection flow and circulation of cooling air along the exterior surfaces of the main trunk 21 and the interior surfaces of the handle 22. It is this unique structure which maintains the handle 22 sufficiently cool despite ultrahigh current operation of the gun. The bore 47 preferably has a diameter which is at least 1⅓ times larger than the outside diameter of the main trunk 21 to promote flow or circulation of a sufficient quantity of ambient air for cooling.

THE CONTROL SWITCH ASSEMBLY

As previously noted, the control switch assembly 25 is mounted on the exterior surface of the air-cooled handle 22. In this way, the control switch assembly 25 is isolated and protected from the high volume of heat radiated by the main trunk 21. However, since the control switch assembly is mounted on the outside of the handle, it must be of a structure to withstand rough usage, yet operate reliably.

The structure of the control switch assembly 25 is shown in FIGS. 1, 2, 8, 9, and 10. As seen, the control switch assembly 25 is provided with a housing 53 which is open at its rearward end to accommodate movement of the trigger member 54. The housing 53 is secured to the handle 22 by a pair of self-locking screws 55 which are passed through housing side flanges 56 and threaded into nuts 57 which are in the form of hollow tubes riveted to the handle 22. The flanges 56 are shaped to conform to the tubular shape of the handle 22 to promote stable mounting of the control switch assembly 25. To provide ruggedness, the switch housing 53 is preferably of one-piece construction, deep drawn and formed to the shape shown from 16-gauge steel. Although shown mounted on the top of the handle 22, the control switch assembly 25 may conveniently be mounted on either the top or the bottom of the handle as a matter of choice.

A conventional normally-open, snap-action electrical switch 58 is protected by a band 59 of fibrous material and securely mounted to the switch housing 53 by a pair of mounting pins 61 passed through the housing 53, the fibrous band 59, and mounting bores which extend through the switch 58. The pins 61 are the spring-loaded type for retention and for easy and quick removal of the switch 58, should this become necessary.

The switch housing 53 is provided with an interior trigger guide surface 62 which may be concave for streamlining as shown or flat. The actuator button 63 of the switch 58 is biased outwardly toward the trigger guide surface 62. A forward portion of the elongate trigger member 54 is interposed between the trigger guide surface 62 and the actuator button 63. The trigger member 54 is curved compatibly with the trigger guide surface 62 and is provided with a manually manipulative configuration 64 at its rearward exposed end. At its forward end, the trigger member 54 is provided with an elongate aperture 65 best shown in FIG. 11. A leaf spring 66 is interposed between the trigger member 54 and the actuator button 63. A bushing 67 is riveted at one end to the portion of the switch housing 53 which forms the forward end portion of the trigger guide surface 62. As best shown in FIG. 9, the free end of the bushing 67 extends through the elongate opening 65 at the forward end of the trigger member 54. A screw 68 passed through the forward end portion of the leaf spring 66 and threaded into the bushing 67 attaches the forward end of the leaf spring to the free end of the bushing 67. The bushing 67 thus serves as a rigid base from which the leaf spring 66 is cantilevered rearwardly. The length of the shank 69 of the bushing 67 is approximately 30 percent greater than the thickness of the trigger member to permit up and down movement of the forward end of trigger member 54 on the bushing 67, and the length of the elongate opening 65 in the trigger member is approximately ¼ inch greater than the outside diameter of the bushing shank 69 to permit forward and rearward or in and out motion of the trigger member 54.

To understand the action of the control switch assembly 25, it should be noted that the leaf spring 66 has a step 71 approximately midway in its cantilevered length so that the rearward portion 70 of the leaf spring adjacent the actuator button 63 is stepped toward but is not in contact with the actuator button when the switch is in the OFF position. When the trigger member 54 is in its rearwardmost position, the forward apex of the step 71 of the leaf spring 66 bears against the underside of the trigger member 54, holding the trigger member tightly against the trigger guide surface 62 and providing the bias force required for returning the trigger to the up OFF position from the depressed ON position. The rearward portion 70 of the leaf spring performs as a resilient finger for actuating the switch button 63 when the trigger member 54 is depressed. Thus, for short periods of welding, the trigger member 54 in its rearwardmost position is simply depressed by thumb or finger pressure against the portion 64 which causes the trigger member 54 to pivot downwardly about its forward end to ON position causing the stepped portion 70 of the leaf spring 66 to depress the actuator element 63 to close the switch 58. Upon release of downward pressure on the trigger member 54, the trigger member 54 is returned to the OFF position by the leaf spring 66, opening the switch 58.

To enable the trigger member 54 to be locked in ON position, a raised semispherical projection is provided on the underside of the trigger member 54. The projection 72 registers with the stepped portion of the leaf spring 66 when the trigger member 54 is in its rearwardmost position, as illustrated in FIG. 1. To lock the trigger member 54 in ON position, the trigger member is not pressed downwardly as described above for short period welding but rather is pushed forwardly into abutment with the forward wall of the housing 53, thereby causing the projection 72 on the trigger member to slide up and over the step 71 in the leaf spring 66, causing the stepped portion of the leaf spring 66 to depress the actuator element 63 as illustrated in FIG. 9. The trigger member is securely held in this locked position by the force of the leaf spring 66.

A salient safety feature is provided by the provision of an inward projection 78 at the rearward end of one of the sidewalls of the switch housing 53. The projection 78 registers with a cutout 79 appropriately located in the adjacent side of the trigger member 54 so that the projection 78 does not interfere with the normal up-and-down pivotal action of the trigger member 54 in its rearward unlocked position. However, as seen in FIG. 10, the projection 78 lies within the cutout 79 when the trigger member is in depressed position thereby preventing the trigger member from being moved forwardly to lock position while depressed. Thus, the potentially dangerous situation of the welding operator unknowingly locking the gun in ON condition is averted. The upward step 71 of the leaf spring also serves to impede any possibility of inadvertently moving the trigger member 54 to lock position while it is depressed for short time welding. Another correlative safety feature is also provided by the projection 78. As seen in FIG. 9, when the trigger member 54 is in forward locked position, the downwardly-inclined rearward end of the arcuate portion of the trigger member 54 is disposed above the projection 78. Thus, downward pressure on the manipulating portion 64 of the trigger member causes the trigger to move rearwardly out of lock position. Hence, the trigger member 54 is readily unlocked by downward and/or rearward force.

The pair of wires 81 and 82 (FIGS. 1 and 2) connecting the snap action switch 58 to a control relay (not shown) or otherwise connecting the switch 58 for ON/OFF welding current and electrode feed control are passed through two small openings 83 and 84 (FIG. 1) through the handle 22. Thus, it can be appreciated that the present invention provides a control switch assembly which is rugged, well protected from the high heat condition of the main trunk 21, and characterized by advantageous operating action.

THE HEAD ASSEMBLY

Moving on now to consideration of the head assembly 24 of the arc welding gun best shown in FIG. 4, it is seen that this assembly comprises basically the head member 86, the current contact tip 37, the tubular shield 89, and the gas nozzle 91. The cylindrical head member 86 is fabricated of brass or other rugged, electrically-conductive metal and is provided with a central axial bore 87, the rearward portion of which is provided with a tapered thread for tight electrically-conductive threaded connection onto the forward end of the copper pipe 35. The rearward portion of the copper current contact tip 37 is telescoped within the forward portion of the bore 87. As previously noted, the electrode 28, having been previously curved in passing through the gooseneck portion of the main trunk 21, provides its own spring force for efficient electrical contact with the current contact tip 37 as it passes through the straight bore 38 of the current contact tip. The unique structure of the current contact tip 37 and its unique threadless connection to the head member are important features of the present invention which will be described in detail further on.

The metal gas nozzle 91 is telescoped over the tubular insulator and ion shield 89 which, in turn, is telescoped over the head member 86. The tubular shield 89 and the gas nozzle 91 are securely clamped in place by an annular, adjustable clamp 97.

It is important to understand the nature and purpose of the tubular shield 89. As previously noted, it has been found that in very high current welding operation, a high density ion field or coronalike condition is developed around the head member 86, the current contact tip 37, and the portion of the electrode 28 projecting forwardly from the current contact tip. It has been further found that because of this high density ion field, merely spacing the gas nozzle 91 from these current conducting members with electrical insulating material does not suffice to prevent arcs from developing between the gas nozzle and the workpiece. These unwanted arcs quickly work severe dissipation damage to the gas nozzle and current conducting members affected. In the present invention, the tubular shield 89 both electrically insulates the gas nozzle 91 from direct contact with the current conducting members of the gun and shields the gas nozzle and its attaching means from the high density ion field to prevent arcing to the gas nozzle. The tubular shield is of seamless, one-piece construction and is formed of high temperature accommodating material which is both electrically-insulating and ion impervious. For example, the tubular shield may be formed of laminated glass cloth in which the layers of glass cloth are bonded together with a silicone resin, N.E.M.A. grade G7. A wall thickness of one-sixteenth inch for the tubular shield 89 has been found practical with this material. Another material which may be used in braided asbestos filled with silicone resin. The tubular shield 89 extends from a point of abutment against an annular shoulder 92 at the rearward terminus of the head member 86 to a point forwardly of the forward end of the head member 86. A centrally recessed washer 93 of electrical insulating material is provided to cover the annular shoulder 92 in order to electrically insulate this portion of the head member 86.

The gas nozzle 91 is of thin wall brass construction. It is preferably provided with longitudinal slots at its rearward end so as to be radially contractable as described in Bernard et al. U.S. Pat. No. 3,283,121. Toward its forward end, the nozzle 91 is brought to a smaller internal diameter by an annular step 94. The gas nozzle is dimensioned such that, when it is telescoped onto the tubular shield 89, the forward end of the tubular shield 89 abuts against the step 94, and the rearward end of the gas nozzle 91 does not reach to the rearward end of the tubular shield 89. Thus, the rearward end of the tubular shield 89 purposefully extends slightly beyond the end of the gas nozzle 91, preferably at least ⅛ inch beyond the end of the gas nozzle. This extension of the tubular shield 89 beyond the end of the gas nozzle is important. It provides a separation dimension between the rearward end of the gas nozzle 91 and the ion density around the head member 86 at the end of the tubular shield 89. If this separation were not provided, the density of ions in the seam between the tubular shield 89 and the washer insulator 93, even though this seam is reasonably tight, would be sufficiently great at very high welding current ranges to kindle an arc between the head member 86 and the gas nozzle 91 should the gas nozzle contact the workpiece during welding. Moreover, it is significant in the overall design of the head assembly 24 that the means for attaching the gas nozzle 91 as well as the gas nozzle itself does not extend beyond the rearward end of the one-piece tubular shield 89 as would be the case, for example, if the gas nozzle were attached to the gun by conventional threaded connection rather than by the clamp 97. It is necessary that the high density of ions present at the rearward end of the tubular shield 89 be free to radiate directly out into space. Such exit is not possible if the metallic nozzle itself or some metallic means for holding the nozzle to the gun extends beyond the end of the tubular shield 89 since such an extension or overhang produces a cavity or seam within which the high density of ions initiate an arc between the nozzle and the head member or other adjacent element of the welding current circuit.

At its forward end, the tubular shield 89 extends slightly forwardly of the truncated cone formation comprising the forward end portion of the head member 86. It has been found that the tubular shield 89 need not extend as far forwardly as the current contact tip 37 even though there is extensive thermionic emission from the highly heated current contact tip 37 and the electrode 28 in this region. In fact, because of very high heat radiation conditions, it is not practical to extend the tubular shield 89 into this region. Nevertheless, there is efficient suppression of arcing to the gas nozzle in this region principally for two reasons: (1) as seen in FIG. 4, the spacing between the outer surface of the current contact tip 37 and the inner surface of the gas nozzle 91 is substantial; and (2) the annularly configurated shielding gas stream in this region acts to continuously purge the space adjacent the inner wall of the gas nozzle of ion concentration.

At this juncture, it will prove helpful to consider the means employed for channeling the shielding gas through the gun to purge the chamber of the gas nozzle and blanket the welding operation.

As previously noted, the shielding gas from the hose 46 is directed into the bore 44 of the main trunk 21 by the inlet tube 45 which conducts the gas to the head assembly 24. From FIG. 4, it is apparent that the shielding gas will flow from the bore 44 of the main trunk into the enlarged diameter region of the head member bore 87 which serves as a pressure chamber. The shielding gas flows out of this pressure chamber through a ring of ports 95 into the annular cavity defined by the exposed interior surface of the tubular shield 89 and the forward reduced diameter portion of the head member 86. There are preferably six such annularly arranged ports 95 to provide proper distribution for annularly-shaped flow. However, a greater or lesser number of ports may also be found practical. It is important to note two characteristics of the ports 95. First, the ports 95 have their exit orifices in the reduced diameter cylindrical portion of the head member outer surface so that the possibility of plugging due to weld spatter is minimized. Second, the ports 95 are each inclined forwardly at an angle of approximately 30° relative to the internal surface of the tubular shield 89, as illustrated in FIG. 4. Consequently, the gas flowing out of the ports 95 at high velocity impinges substantially tangentially against the interior surface of the tubular shield 89 and flows along the interior surface of the tubular shield 89 and the forward exposed portion of the interior surface of the gas nozzle 91, as indicated by the flow arrows. This annular stream is substantially laminar and acts to purge the region adjacent the exposed interior surface of the gas nozzle 91 to reduce the extent of ion density in this region.

THE WELDING CURRENT CONTACT TIP

The welding current contact tip 37 of the present invention is characterized by two salient features: (1) an inexpensive structure which provides an improved method of securing the current contact tip in the head member bore, and (2) an inexpensive method of manufacture which provides improved wear properties in the current contact tip. Consideration will be given first to the manner in which the current contact tip is secured in the head member bore 87.

Figures 5, 6, 7:
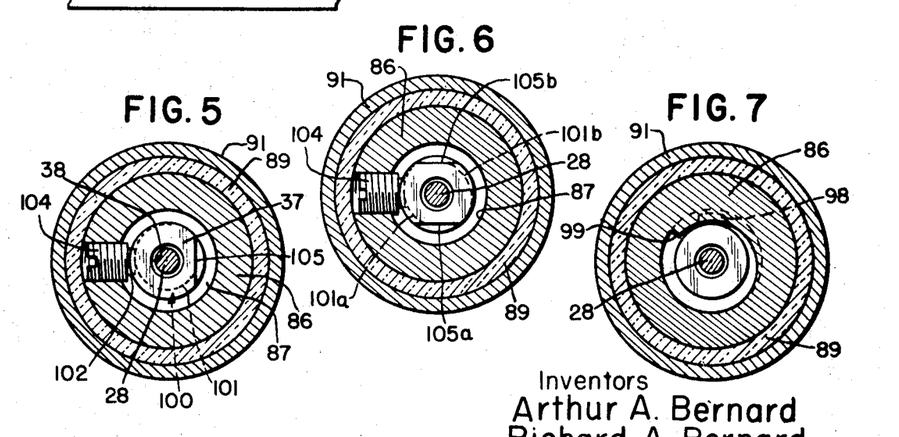
FIG. 5 is a cross-sectional view taken at 5–5 of FIG. 4.
FIG. 6 is a cross-sectional view taken at the same location as FIG. 5 but showing another form of the present invention.
FIG. 7 is a cross-sectional view also taken at the same location as FIG. 5 but showing still another form of the present invention.
Figures 12, 13, 14, 15, 16, 17:
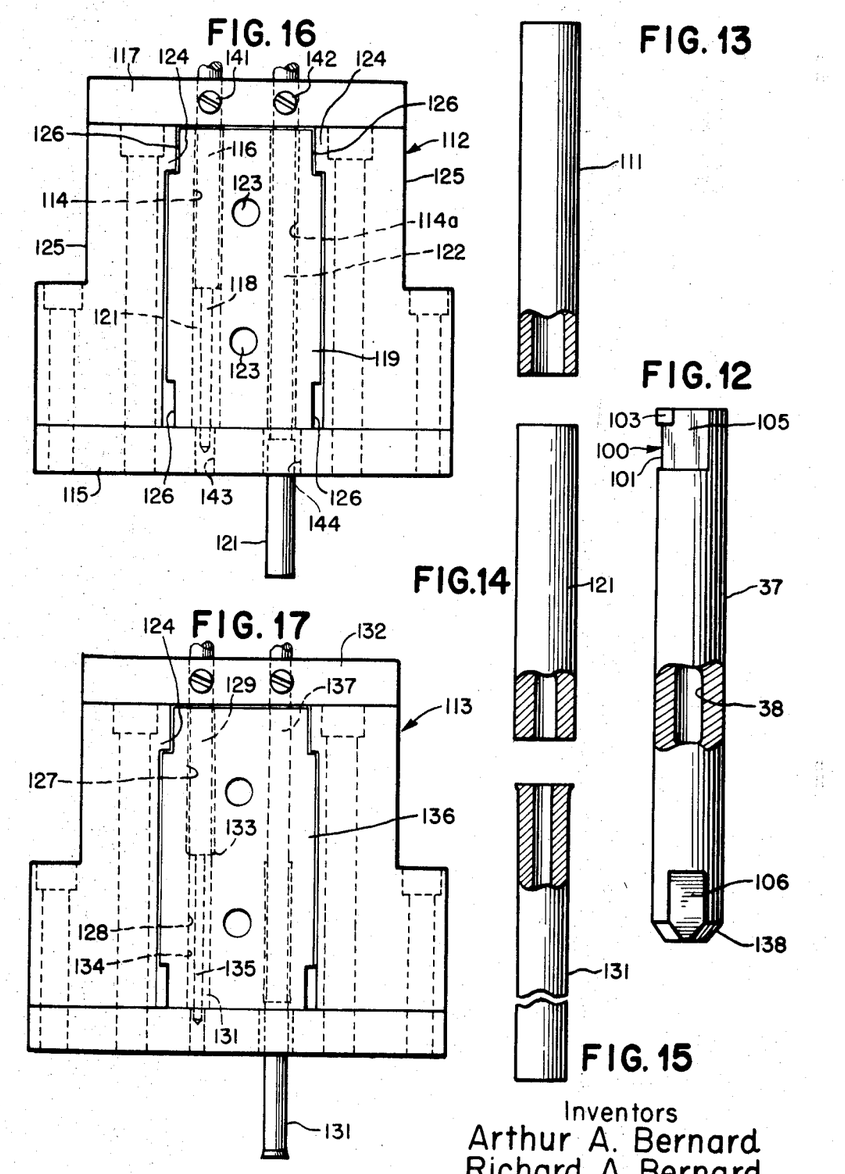
FIG. 12 is an enlarged view in elevation of the current contact tip of the present invention.
FIG. 13 is an enlarged side view partially in elevation and partially in cross section of a short section of copper tube cut from a random length of commercial size seamless copper tube from which the current contact tip of the present invention is formed.
FIG. 14 is an enlarged side view partially in cross section and partially in elevation illustrating the product of one step in the method of manufacture of the current contact tip in accordance with the present invention.
FIG. 15 is an enlarged side view partially in elevation and partially in cross section illustrating the product of another step in the method of manufacture of the current contact tip in accordance with the present invention.
FIG. 16 shows the operation of a punch press die according to the present invention by which the length of copper tube section shown in FIG. 13 is shortened to increase the thickness of the wall and reduce the inside diameter and to apply additional compression pressure to refine and increase the density of the copper in order to produce the element shown in FIG. 14.
FIG. 17 shows operation of a punch press die in accordance with the method of the present invention to extrude the diameter of the tube section shown in FIG. 14 to reduce both the inside diameter and the outside diameter in order to produce the element shown in FIG. 15.

The current contact tip 37 of the present invention is simple in configuration. It is not threaded and, hence, approaches the simplicity of a short length of plain, heavy wall copper tube. It is locked in the bore 87 of the head member by cam action. In brief, the structure of the current contact tip 37 embodies an annularly-oriented eccentric cam or curved wedge surface 101 (FIG. 5). The curved wedge surface comes in contact with a follower surface 102 which is stationary in relation to the head member 86 so that when the current contact tip is turned within the head member bore 87, a binding force is developed between the curved wedge surface 101 and the stationary follower surface 102 which clamps the current contact tip within the bore 87. As best illustrated in FIG. 12, the cam surface 101 forms the floor of a channel recess 100 in the cylindrical outer surface of the current contact tip which recess is spaced forwardly from the rearward end of the current contact tip so that an annularly oriented flange 103 is formed to prevent the current contact tip from being pushed forwardly out of the head member 86 by unusually high amount of friction which the electrode 28, passing through the current contact tip bore 38, develops. The follower surface 102 is at the end of a projection 104 extending radially into the head member bore 87. As illustrated in FIGS. 4, 5, and 6, the projection 104 is preferably in the form of a set screw threaded through the wall of the head member 86 with a flat end face, commonly called a half-dog end, to serve as the follower surface 102. Although the projection could also be integral with the head member, the use of a set screw for this purpose provides a means for adjusting the clamping action employed to hold the current contact tip 37 in the head member bore 87. As shown in FIGS. 5 and 12, a recessed land 105 is provided in the outer surface of the current contact tip to extend as a guideway from the rearward end of the current contact tip to the starting end of the cam surface 101 at the same depth as the starting end of the cam surface 101. Accordingly, when the current contact tip 37 is inserted rearwardly into the head member bore 87, it is rotated until the land 105 registers with the set screw projection 104 whereupon the current contact tip is moved further rearwardly in the head member bore 87 until the set screw 104 registers with the cam surface 101 and is then rotated to bring the cam surface into binding engagement with the set screw follower surface 102. The sidewalls of the annular recess channel 100 prevent axial dislocation of the current contact tip 37 in the head member bore 87.

It should be noted from FIG. 4 that the set screw projection 104 is located in the enlarged diameter section of the head member bore 87 so that the point on surface of the current contact tip 37 diametrically opposite from the point of contact of the current contact tip with the set screw projection 104 is unsupported. More specifically, the rearward end portion of the current contact tip 37 is cantilevered in the enlarged diameter section of the bore 87 with the result that the force developed at the point of contact with the set screw projection 104 causes the current contact tip to flex slightly but without exceeding the elastic limit of the current contact tip. It is intended that even if the current contact tip 37 is forcibly rotated 360° against the set screw projection 104, the elastic limit of the current contact tip will not be exceeded in flexing and that the follower surface 102 will merely be returned to the base starting point of the cam surface 101. In this way the current contact tip is effectively held at three points of force contact along its length, one force contact point being the point of contact with the set screw projection 104, the second being on the opposite side of the current contact tip and adjacent the rearward end of the smaller diameter section of the head member bore 87, and the third being adjacent the forward end of the head member bore 87 on the same side of the current contact tip as the set screw projection 104. Because the current contact tip 37 is slightly flexed against the set screw projection 104, the clamping force exerted on the current contact tip will be retained as the head member 86, the set screw 104, and the current contact tip 37 heat and cool and, hence, expand and contract during welding.

To facilitate turning the current contact tip 37 in the head member bore with a wrench or pair of pliers, a flat spot such as shown at 106 in FIG. 12 is preferably provided on each side of the current contact tip 37 at its forward end.

Referring now to FIG. 6, there is shown another preferred form of the current contact tip in which a pair of cam surfaces 101a and 101b are provided in diametrically opposite relationship and with a corresponding pair of recessed land guideways 105a and 105b also in diametrically opposite relationship. The clamping force for holding the current contact tip is developed in the same manner as described above. The advantage of the FIG. 6 form of current contact tip arises from the fact that the electrode 28 normally tends to wear the bore 38 of the current contact tip on one side at its outlet. Accordingly, with the FIG. 6 form of current contact tip, the life of the current contact tip can be extended by removing the current contact tip from the head member bore and refastening it in 180° rotated position.

Referring briefly to FIG. 7, there is shown still another form of the curved wedge current contact connection concept of the present invention. In this case, a projection 98 is provided on the current contact tip while an annularly oriented channel 99 providing the requisite curved wedge cam surface is provided on the interior wall of the head member 86.

Consideration may now be given to the method of manufacture of the current contact tip 37. For the purpose of explanation, the dimensions of one size of current contact tip will be referred to in describing the method of manufacture. It should be understood that the dimensions will differ in other sizes.

The completed tubular current contact tip 37 shown in FIG. 12 will be considered to have a length of 2 inches, an outside diameter of nine thirty-seconds inch, a wall thickness of 0.0806 inch, and an inside bore diameter of 0.120 inch. A bore diameter of 0.120 inch is commonly used for applying 3/32-inch diameter electrode. This particular size and shape of current contact tip is formed from a 2-inch length section of seamless commercial size electrolytic tough pitch copper tubing having a 5/16-inch outside diameter with a 0.065-inch wall thickness. This 2-inch section of commercial copper tube is depicted in FIG. 13 and identified by reference numeral 111.

As will be seen, the present method of manufacture involves an increase in density of the copper which must be taken into account selecting the initial length of the tubing section 111. In the present example, approximately 0.020 inch of the 2-inch length of the tube section 111 is allowed for this increase in density.

Referring now to FIGS. 16 and 17, punch press dies 112 and 113 are shown to aid in explaining the method of manufacture of the present invention. The particular design of the dies 112 and 113 does not form a part of this invention. Any die design which will accomplish the steps of manufacture of this invention may be used. Accordingly, in the interest of conciseness, the various obvious or conventional details of the structures of the dies 112 and 113 will not be described.

Referring now specifically to FIG. 16, the die 112 is shown in closed position. When the die is in open position, the section of commercial tube shown in FIG. 13 is dropped into the bore 114 which is 0.3125 inch in diameter and 3.750 inches deep. The upper portion of the bore 114 may be 0.002 or 0.003 larger in diameter for ease of insertion of the tube section 111. The bore 114 is closed at its lower end by the lower end member 115. The piston 116 extends 2 inches below the upper end member 117. The upper end member 117 is not affixed to the die 112 proper but rather is affixed to the piston 116 and to a second piston 122 by screws 141 and 142, respectively, so as to travel with these pistons. It is important to note at this point that the 2-inch extension of the piston 116 beyond the traveling upper end member 117 plus the 2-inch length of the tube section 111 of commercial tube (FIG. 13) would equal a distance ¼ inch greater than the depth of the bore 114. Therefore, for the die to be in closed position at the end of the stroke of the punch press (not shown) or other means employed for driving the piston 116, the 2-inch length of the commercial tube section must be compressed to a 1.750-inch length. Since the outside diameter of the tube section cannot expand beyond the 0.3125-inch diameter of the die bore 114, the wall thickness of the tube section is forced to increase by cold flow under the compression force exerted by the piston 116, thereby reducing the diameter of the tube section bore. In accordance with the present invention, the density of the copper is preferably increased by reduction of the total displacement volume of the tube section. To accomplish this increase in density and to limit the reduction of the initial 0.1825-inch diameter bore to a uniform 0.148 inch throughout the length of the tube section by uniform upset of the copper throughout the length of the tube section, a hard steel arbor 118 of 0.148-inch diameter projects coaxially and downwardly from the forward end of the piston 116. This arbor projects a distance greater than 2 inches from the forward face of the piston 116 so that it extends through the entire length of the tube section before the compression and upsetting force is applied to the top end of the tube section. A bore 143 is provided in the lower end member 114 to accommodate the forward end of the arbor 118 when the die 112 is closed as shown in FIG. 15.

The product of the compression operation performed by the die 112 is shown in FIG. 14. It consists of a second stage tube 121 of greater copper density. Its outside diameter is 0.3125 inch; its internal or bore diameter is 0.148 inch; its wall thickness is 0.08225 inch; its cross-sectional area is 0.0593 square inch; and its length is 1.750 inches.

The die block 119 itself is preferably fitted with a second bore 114a which is identical with the bore 114, and the die block 119 is removable from the die 112 proper for reversing the die block 119 end-over-end to occupy a 180° rotated position in the die. This reversing operation is practiced to obtain ejection of the previously formed tube section as the next tube is formed. More specifically, during the downstroke of the punch press, as the section of tube in bore 114 is being compressed and upset by the piston 116, the section of tube previously compressed and upset in bore 114a is ejected by the piston 122 through a bore 144 in the lower end member 115, as depicted in FIG. 16. Upon completion of the downstroke of the punch press, the upstroke of the punch press is initiated, and the pistons 122 and 116 including the arbor 118 are completely withdrawn from the die block bores 114 and 114a. The die block 119 is then withdrawn from between the die side members 125 which form a stall for the die block 119, rotated 180°, and reinserted between the die side members 125. In this position, the bore 114a is aligned with the piston 116, and the bore 114 is aligned with piston 122 so that on the next downstroke of the punch press, the tube section previously compressed and upset in the bore 114 is ejected by the piston 122 as another section of commercial tube is being compressed and upset in the bore 114a. This cycle is continuously repeated. A hairpin-shaped gripping handle (not shown) is attached to the holes 123 to facilitate the removal, turnover, and reinsertion of the die block 119. To insure alignment of the bores 114 and 114a with the pistons prior to each downstroke, a suitable retainer plate (not shown) should be provided at the back of the die 112 and suitable latching means (not shown) provided on the front of the die 112. To prevent the die block from being dislodged on the upstroke of the punch press, projections 124 on the die side members 125 fit into steps 126 in the die block 119. Since the die block 119 is turned end-over-end after each upstroke of the punch press, the steps 126 are provided at both ends of the die block 119.

The next step is forming the second stage tube 121 of FIG. 14 into the third stage tube 131 of FIG. 15 in the die 113 shown in FIG. 17. In this step the following takes place: (1) the 0.3125-inch outside diameter is reduced to 0.2812 inch; (2) the 0.1480-inch inside bore diameter is reduced to 0.120 inch; the 0.08225-inch wall thickness is reduced by approximately 0.0016 inch to a thickness of 0.0806 inch; its cross-sectional area is reduced from 0.0593 square inch to 0.0508 square inch; and (3) the length is increased from 1.750 inches back to the original length of about 2.00 inches.

The punch press die 113 is shown in closed position in FIG. 17. As seen, except for differences in the shape and dimensions of the die block bores and the dimensions of the pistons, its structure is identical to that of the die 112. The operation of the die 113 is as follows. With the die 113 open, the second stage tube 121 is dropped into the enlarged diameter section 127 of the bore 128. The diameter of the bore section 127 is 0.002 or 0.003 inch larger than the 0.3125 inch outside diameter of the second stage tube section 121 to permit easy entry of the second stage tube into the bore section 127. The bore section 127 has a depth of 1.750 inches. At this point, the diameter of the bore 128 is reduced by a conical restriction step 133 to a diameter of 0.2812 inch. The included angle of the conical restriction 133 is 40°. The bottom section 134 of the bore 128 including the conical restriction step 133 is 2.00 inches.

The piston 129 extends beyond the traveling top end member 132 for a distance of 1.750 inches, and its action on the downstroke of the punch press is to force the tube in the bore section 127 to be extruded and compressed into the reduced diameter bore section 134. To form a uniform 0.120-inch inside diameter throughout the length of the extruded tube, a very high tensile strength steel wire arbor 135 (such as piano wire) of 0.120-inch outside diameter extends coaxially with and downwardly from the forward end of the piston 129 for a distance greater than 2 inches so that the arbor is threaded through the length of the tube being extruded before the extrusion begins. It should be noted that the space between the wall of the 0.2812-inch diameter bore section and the surface of the arbor 135 is about 0.0008 inch less than the initial thickness of the wall being extruded. The copper is thereby subjected to a second application of high compression forces to increase the length of the tube and increase the density of the copper.

The removal of the extruded tube section from the die block 136 is carried out in the same manner as described above in relation of the die 112 of FIG. 16. The die block 136 is withdrawn, rotated 180° end-over-end, and the extruded tube is pushed out of the die block by the piston 137 on the downward stroke of the punch press simultaneously as another tube section is being extruded by the piston 129.

The produce of the operation of the die 113 is the third stage tube section 131 shown in FIG. 15. Its length, outside diameter, and bore diameter are that required for the finished current contact tip 37 shown in FIG. 12. The recessed curved wedge, the guideway 105, the flat spots 106, and the front end bevel 138 are provided by suitable finishing operations.

It is important to note that respective steps performed by the dies 112 and 113 may not both be necessary in forming a current contact tip according to the present invention. For example, if a 5/16-inch outside diameter current contact tip is desired instead of a 9/32-inch outside diameter, the current contact tip may be formed from a 5/16-inch outside diameter tube with a 0.065-inch wall thickness in the single step performed by die 112 of FIG. 16. In this case, the 0.065-inch wall would be upset by compression force to increase it to a 0.138-inch wall to provide a 0.036-inch diameter bore. The point is that only the step performed by the die 112 is necessary if the ultimate current contact tip is to have approximately the same diameter as the commercial tubing from which it is formed since any size smaller internal bore can be provided by the compression upset operation performed by the die 112. Of course, the die bore lengths, piston lengths, arbor diameter, and related dimensions of the die will vary. But the compression upset operation itself is capable of converting a commercial size of seamless copper tube into a tube of any size smaller internal bore diameter. The second extrusion step is performed if a reduction in outside diameter is required. It is also important to note that the increase in density obtained in the copper tubing is accompanied by a refinement of the grain structure of the copper with the result that the current contact tip so produced has a greater hardness and, hence, a greater life. Accordingly, the method herein described may be employed to great advantage in manufacturing current contact tips not only of the present design but also of threaded and other conventional designs.

Also, it is important to note that in carrying out the present invention the arbors 118 and 135 may be omitted in many cases since even without these arbors the processes described above and illustrated in FIGS. 16 and 17 will yield a current contact tip of refined grain structure and increased hardness having a smooth, uniform bore with an internal diameter accurate to within plus or minus 0.002 inch. When the internal diameter must be accurate to plus or minus 0.001 inch, the arbors 118 and 135 should be used.

While several specific forms of the present invention have been illustrated and described, it is to be understood that this is merely by way of example and in no manner to be construed as a limitation. It is contemplated that certain modifications may be made within the scope of the claims without departing from the spirit of the invention.

It will be noted that in this detailed description, the expression "current contact tip" has been used to refer to a particular part of the arc welding gun since this expression is commonly used in the art. However, in the claims, clarity in defining structural relationships will be promoted by using the expression "current contact member" to designated this part.

It should also be noted that the expression "ion impervious" has been used both in the detailed description and in the claims to express characteristic of the tubular shield 89 in preventing appreciable ion density in or ion flow through the space occupied by said tubular shield in the defined arc welding gun environment. This expression is not intended to preclude de minimus ion presence or movement in the material of which the tubular shield is formed.

We claim:

1. In an arc welding gun for applying continuous-feed, consumable-electrode arc welding processes and which has a head member at its arc end with a bore receiving a current contact member, and a radial adjustable element projecting radially into the head member bore wherein the improvement comprises: said current contact member being a tubular electrically conductive current contact member having at least one annularly­oriented recessed channel in said current contact member periphery and a longitudinally-oriented land in the periphery of said current contact member extending from the deepest portion of said recessed channel to one end of said current contact member to enable registration of said projecting element with said recessed channel when said current contact member is inserted into said head member bore, said recessed channel having for its base surface an annularly-oriented eccentric curved-wedge cam surface engaging and wedging radially against said projecting element when said current contact member is compatibly positioned and rotated within said head member bore.

2. The improvement defined in claim 1 wherein said tubular current contact member has a pair of diametrically-opposed flat spots in its periphery to facilitate gripping said current contact member to rotate said current contact member within said head member bore.

3. In an arc welding gun for applying continuous-feed, consumable-electrode arc welding processes and which has a head member at its arc end with a bore receiving a current contact member, and an element projecting radially into the head member bore, wherein the improvement comprises: said current contact member being a tubular electrically conductive current contact member having a pair of annularly-oriented recessed channels disposed in diametrically opposite relationship in said current contact member periphery and a pair of longitudinally-oriented lands disposed in diametrically opposite relationship in the periphery of said current contact member, each of said lands extending from the deepest portion of an associated one of said pair of recessed channels to one end of said current contact member to permit registration of said projecting element selectively with said associated recessed channel when said current contact member is inserted into said head member bore, each of said recessed channels having for its base surface an annularly-oriented eccentric curved-wedge cam surface engaging and wedging radially against said projecting element when said current contact member is compatibly positioned and rotated within said head member bore thereby enabling said current contact member to be selectively wedged within said head member bore in either of two 180° rotated orientations.

4. In an arc welding gun for applying continuous-feed, consumable-electrode arc welding processes and which has a head member at its arc end with a bore receiving a current contact member, and an adjustable set screw projecting radially into said head member bore, the improvement comprising: said current contact member being a tubular electrically conductive current contact member having at least one annularly-oriented eccentric curved-wedge cam surface in its periphery engaging and wedging radially against said set screw when said current contact member is compatibly positioned and rotated within said head member bore, and a step in said head member bore forwardly of said set screw enlarging the diameter of said head member bore for the portion of its length in which said cam surface coacts with said set screw leaving the periphery of said current contact member diametrically opposite the point of coaction of said projecting element unsupported to permit slight flexing of said current contact member when cam surface is wedged against said set screw.

UNITED STATES PATENT OFFICE
CERTIFICATE OF CORRECTION

Patent No. 3,576,423               Dated April 27, 1971

Inventor(s) ARTHUR A. BERNARD and RICHARD A. BERNARD

It is certified that error appears in the above-identified patent and that said Letters Patent are hereby corrected as shown below:

| | |
|---|---|
| Title page, | "Assignee<br>Bernard Welding Equipment Company, Beecher, Ill." should read<br>--Assignee<br>Dover Corporation, New York, N. Y. |
| In the Abstract, line 9, | "top" should read --tip-- |
| Column 6, lines 64, 65, | "and inch" should read<br>--inch and 5/8 inch.-- |
| Column 11, line 1, | "in" should read --is-- |
| Column 16, line 3, | "produce" should read --product-- |
| line 60, | "designated" should read --designate-- |
| In the claims:<br>Column 17, line 2, | "annularlyeoriented" should read --annularly oriented-- |

Signed and sealed this 9th day of November 1971.

(SEAL)
Attest:

EDWARD M. FLETCHER, JR.
Attesting Officer

ROBERT GOTTSCHALK
Acting Commissioner of Patents